(12) United States Patent
Tange et al.

(10) Patent No.: US 11,285,776 B2
(45) Date of Patent: Mar. 29, 2022

(54) HOLLOW SPRING MEMBER AND MANUFACTURING METHOD THEREFOR

(71) Applicant: NHK SPRING CO., LTD., Yokohama (JP)

(72) Inventors: Akira Tange, Yokohama (JP); Masato Sugawara, Yokohama (JP); Yutaka Wakabayashi, Franklin, KY (US)

(73) Assignee: NHK SPRING CO., LTD., Kanagawa (JP)

( * ) Notice: Subject to any disclaimer, the term of this patent is extended or adjusted under 35 U.S.C. 154(b) by 90 days.

(21) Appl. No.: 16/146,269

(22) Filed: Sep. 28, 2018

(65) Prior Publication Data

US 2019/0030980 A1   Jan. 31, 2019

Related U.S. Application Data

(63) Continuation of application No. PCT/JP2017/013094, filed on Mar. 29, 2017.

(30) Foreign Application Priority Data

Mar. 30, 2016   (JP) .............................. JP2016-068060

(51) Int. Cl.
   *B60G 21/055*   (2006.01)
   *F16F 1/02*   (2006.01)
   (Continued)

(52) U.S. Cl.
   CPC .............. *B60G 21/055* (2013.01); *F16F 1/02* (2013.01); *F16F 1/14* (2013.01); *B23P 23/04* (2013.01);
   (Continued)

(58) Field of Classification Search
   CPC ............ B60G 21/055; B60G 2206/012; B60G 2206/80; B60G 2206/72; B60G 2206/8103; B23P 23/04; F16F 1/14; F16F 1/02
   See application file for complete search history.

(56) References Cited

U.S. PATENT DOCUMENTS 2,643,177 A * 6/1953 Wachter ................. D21H 21/36
                                                206/213.1
3,876,553 A * 4/1975 Kader ..................... C23F 11/08
                                                252/389.2
(Continued)

FOREIGN PATENT DOCUMENTS

EP   0788903 A1   8/1993
EP   1736327 A2   12/2006
(Continued)

OTHER PUBLICATIONS

Extended European Search Report (EESR) dated Oct. 29, 2019 issued in European Application No. 17775321.7.
(Continued)

*Primary Examiner* — Xuan Lan Nguyen
(74) *Attorney, Agent, or Firm* — Holtz, Holtz & Volek PC (57) ABSTRACT

A terminal sealed portion is formed on an end portion of a hollow rod made of steel. An enclosed space is formed on an inner side of the hollow rod. At an end of the enclosed space, a terminal gap is formed. A volatile powdered rust inhibitor is supplied in the enclosed space. As the volatile powdered rust inhibitor is vaporized, the enclosed space is turned into a rust-inhibiting atmosphere. As the vaporized component of the volatile powdered rust inhibitor is adsorbed to an inner surface of the enclosed space, an inner surface rust-inhibiting film is formed. The vaporized component also enters inside the terminal gap, and forms a terminal rust-inhibiting film.

9 Claims, 7 Drawing Sheets

(51) Int. Cl.
*F16F 1/14* (2006.01)
*B23P 23/04* (2006.01)

(52) U.S. Cl.
CPC .... *B60G 2206/012* (2013.01); *B60G 2206/72* (2013.01); *B60G 2206/80* (2013.01); *B60G 2206/8103* (2013.01)

(56) References Cited

U.S. PATENT DOCUMENTS

| | | | | |
|---|---|---|---|---|
| 3,901,836 | A * | 8/1975 | Kader | C23C 22/23 106/14.12 |
| 4,469,469 | A * | 9/1984 | Kennedy, Jr. | F16L 58/12 138/DIG. 6 |
| 4,526,628 | A * | 7/1985 | Ohno | B23P 15/00 148/520 |
| 5,266,104 | A * | 11/1993 | Vincent | B65D 59/06 106/14.13 |
| 5,352,383 | A * | 10/1994 | Johnson | B65D 59/06 252/389.62 |
| 8,800,224 | B1 * | 8/2014 | Kharshan | C23F 11/02 52/223.1 |
| 2002/0170177 | A1 | 11/2002 | Koyama et al. | |
| 2005/0011592 | A1 | 1/2005 | Smith | |
| 2006/0200990 | A1 | 9/2006 | Koyama et al. | |

FOREIGN PATENT DOCUMENTS

| | | |
|---|---|---|
| JP | 49083454 U | 7/1974 |
| JP | 59013082 A | 1/1984 |
| JP | 59097758 U | 7/1984 |
| JP | 60020404 U | 2/1985 |
| JP | H02283519 A | 11/1990 |
| JP | H0650370 A | 2/1994 |
| JP | H07237428 A | 9/1995 |
| JP | 2002331326 A | 11/2002 |
| JP | 2006335119 A | 12/2006 |
| JP | 2007320344 A | 12/2007 |

OTHER PUBLICATIONS

International Search Report (ISR) dated Jun. 27, 2017 issued in International Application No. PCT/JP2017/013094.
Written Opinion dated Jun. 27, 2017 issued in International Application No. PCT/JP2017/013094.
Japanese Office Action (and English language translation thereof) dated Apr. 9, 2019 issued in counterpart Japanese Application No. 2018-509392.

* cited by examiner

HOLLOW SPRING MEMBER AND MANUFACTURING METHOD THEREFOR

CROSS-REFERENCE TO RELATED APPLICATIONS

This application is a Continuation Application of PCT Application No. PCT/JP2017/013094, filed Mar. 29, 2017 and based upon and claiming the benefit of priority from prior Japanese Patent Application No. 2016-068060, filed Mar. 30, 2016, the entire contents of all of which are incorporated herein by reference.

BACKGROUND OF THE INVENTION

1. Field of the Invention

The present invention relates to a hollow spring member such as a hollow stabilizer arranged in a suspension mechanism of a vehicle such as a car, and a method of manufacturing the same.

2. Description of the Related Art

A hollow stabilizer arranged in a suspension mechanism of a vehicle is constituted of a hollow rod made of steel (a steel pipe). The hollow stabilizer includes a torsion portion (a twisted portion), and a pair of arm portions (arms). The torsion portion extends in a width direction of the vehicle. The arm portions are extended from both ends of the torsion portion through curved portions, respectively. On a distal end of each of the arm portions, an eye portion is formed. In one example of the stabilizer, the torsion portion is supported on a vehicle body via a support portion, and the eye portion is connected to a suspension arm, etc., via a connecting member. The support portion includes a rubber bushing. One example of the connecting member is a link member (a stabilizer link). With respect to the stabilizer fitted in the suspension mechanism, as the arm portions, the curved portions, and the torsion portion function as a spring in reaction to a rolling behavior of the vehicle body, roll stiffness of the vehicle can be enhanced.

Patent Literature 1 (JP H07-237428 A) or Patent Literature 2 (JP 2002-331326 A) describes an example of a hollow stabilizer. Eye portions are formed on both ends of the hollow stabilizer, respectively. A material of the hollow stabilizer is a hollow rod. By flattening end portions of the hollow rod in a radial direction of the hollow rod by upsetting, the eye portions are formed. In each of the eye portions, a through-hole is formed. A connecting member such as a stabilizer link is inserted into the through-hole. The eye portion is connected to a suspension arm, etc., via the connecting member.

In order to reduce fuel consumption of a vehicle, or enhance the driving performance, there is an increasing demand for reducing the weight of vehicles. A spring member such as a stabilizer or a coil spring which constitutes the suspension mechanism is not an exception, and reducing the weight is an inevitable requirement. For example, by using a high-strength spring steel for the material of the hollow stabilizer, attempts have been made to reduce the thickness of the hollow stabilizer as much as possible. Further, forming a compressive residual stress by performing shot peening on an inner surface of the hollow stabilizer helps to achieve high-strength in the hollow stabilizer.

However, with respect to durability of the hollow stabilizer, the smaller the thickness of the hollow stabilizer is, the greater the effect of the rust becomes. For example, rust formed on the outer surface or the inner surface of the hollow stabilizer may cause a small pit. When the pit grows to some degree, the possibility that the pit may become a starting point of a break in the hollow stabilizer which is used under high stress is increased. Accordingly, some preventive measures must be taken against rust which will be formed on the inner surface, in addition to the outer surface, for the hollow stabilizer.

If a pair of terminal sealed portions is formed by flattening both ends of the hollow rod, an enclosed space is formed between these terminal sealed portions. At an end of the enclosed space, a tapered gap in which the gap is narrowed toward an inner surface joined portion of the terminal sealed portion is formed. In the present specification, the gap is referred to as a terminal gap. When rust is formed on an inner surface of the terminal gap, it is concerned that structural integrity of the terminal sealed portion and the eye portion may be adversely affected.

The main cause of rust formed on the inner surface of the hollow stabilizer is moisture. For example, when a hollow stabilizer is manufactured, there are cases where moisture inevitably exists inside a hollow rod used as the material of the hollow stabilizer. This moisture becomes a cause of the rust. In order to prevent rust from being formed, applying oil to the inner part of the hollow stabilizer has been considered. However, such oil cannot be adopted since it causes smoke or fire in a heat treatment which is performed in the step of manufacturing the hollow stabilizer. As the other means for rust prevention, applying coating to the inner surface of the hollow stabilizer has been considered. However, there is a problem that drying a coating material applied to the inner surface of the hollow stabilizer takes long time. In addition, if a part of the coating material exists at an end portion of the hollow rod, when the eye portions are formed by flattening the end portions, the coating material remaining at the end portion causes press bonding failure of the terminal sealed portion.

BRIEF SUMMARY OF THE INVENTION

Accordingly, an object of the present invention is to provide a hollow spring member capable of suppressing formation of rust on an inner surface, etc., of a hollow rod made of steel, and a method of manufacturing the same.

A hollow spring member according to one embodiment includes a hollow rod formed of a rod-shaped steel material. At both ends of the hollow rod, terminal sealed portions are formed, respectively. An enclosed space is formed between the pair of terminal sealed portions. At an end of the enclosed space, a terminal gap in which the gap is narrowed toward an inner surface joined portion of the terminal sealed portion is formed. Further, the hollow spring member comprises a volatile powdered rust inhibitor supplied in the enclosed space, an inner surface rust-inhibiting film which exists on an inner surface of the enclosed space, and a terminal rust-inhibiting film which exists at the terminal gap. The inner surface rust-inhibiting film exists on the inner surface of the enclosed space as a component of the volatile powdered rust inhibitor which has vaporized within the enclosed space is adsorbed to the inner surface of the enclosed space. The terminal rust-inhibiting film exists in the terminal gap as the vaporized component is adsorbed to an inner surface of the terminal gap. Preferably, the volatile powdered rust inhibitor should be supplied in an amount sufficient for the component which has vaporized in the enclosed space to be saturated in the enclosed space.

According to the present invention, by a vaporized component of the volatile powdered rust inhibitor supplied in the enclosed space of the hollow rod, the inner surface rust-inhibiting film is formed. By the inner surface rust-inhibiting film, rusting of the inner surface of the enclosed space can be suppressed. Moreover, the terminal rust-inhibiting film is formed as the vaporized component enters inside the terminal gap, and thus, rusting of a part near the terminal gap can also be suppressed.

When the volatile powdered rust inhibitor is supplied within the hollow rod, the volatile powdered rust inhibitor may adhere to an end portion of the hollow rod. The adhered volatile powdered rust inhibitor is removed as a hollow rod end portion is heated when the terminal sealed portion is plastically worked. Accordingly, it is possible to prevent the volatile powdered rust inhibitor from affecting the joining strength of the terminal sealed portion. Shot peening indentations (i.e., a rough surface) may be formed on the inner surface of the hollow spring member. Since the vaporized component of the volatile powdered rust inhibitor is adsorbed to the rough surface, a rust-inhibiting effect can also be exhibited on a hollow spring material having the shot peening indentations.

An example of the hollow spring member is a hollow stabilizer constituted of a hollow rod made of steel. The hollow stabilizer includes a torsion portion extending in a width direction of a vehicle, curved portions formed at both ends of the torsion portion, arm portions extended from the curved portions, and the terminal sealed portion formed at a distal end of each of the arm portions. On an inner surface of the hollow spring member, a rough surface (shot peening indentations) constituted of small irregularities may be formed. Another example of the hollow spring member is a hollow coil spring constituted of a hollow rod made of steel that is formed into a helical shape.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A hollow stabilizer 10 according to a first embodiment of a hollow spring member, and a method of manufacturing the same will be explained with reference to FIGS. 1 to 8.

Figure 1:
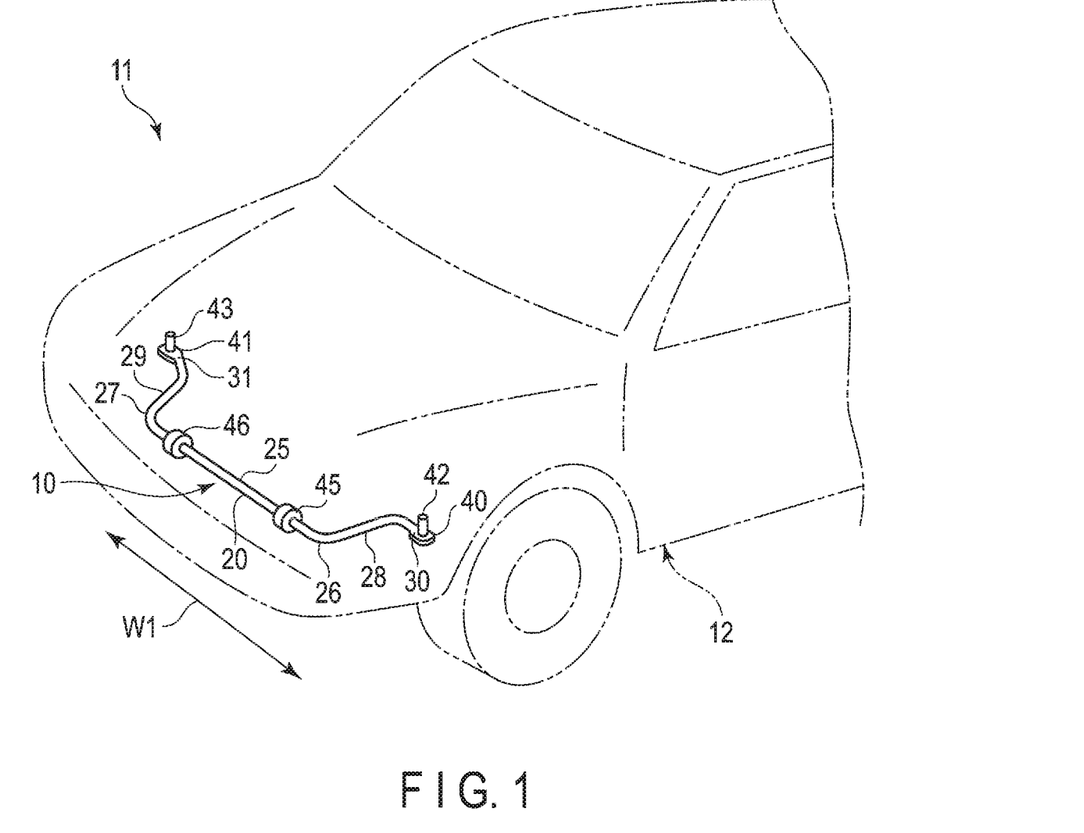
FIG. 1 is a perspective view showing a part of a vehicle and a stabilizer.

FIG. 1 shows a part of a vehicle 11 comprising the hollow stabilizer 10 (which may hereinafter be simply referred to as a stabilizer 10). The stabilizer 10 constitutes a part of a suspension mechanism, and is arranged at the lower part of a vehicle body 12.

Figure 2:
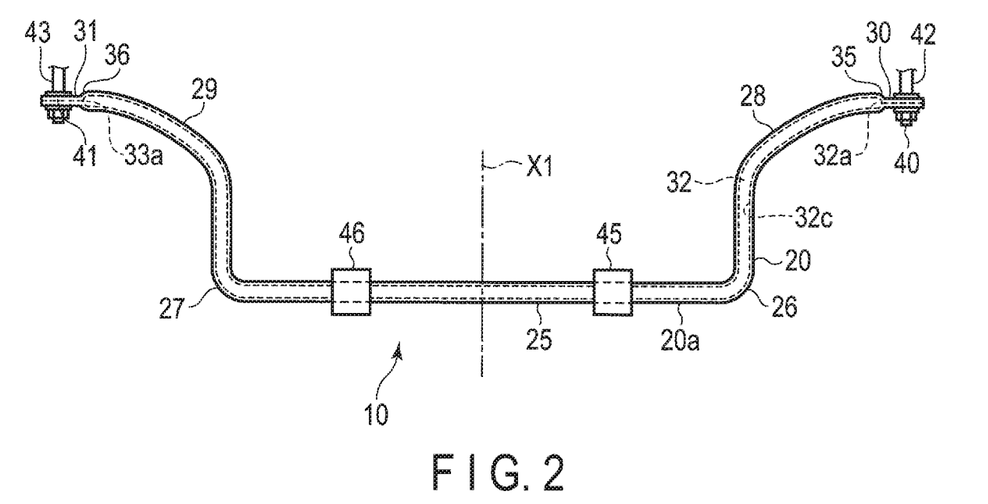
FIG. 2 is a plan view showing an embodiment of a hollow stabilizer.

FIG. 2 is a plan view showing an example of the stabilizer 10. The stabilizer 10 includes a hollow rod 20. The hollow rod 20 is made of a rod-shaped steel material, and is formed by a bending machine. An example of the material of the hollow rod 20 is a steel pipe made of spring steel. More specifically, a steel pipe whose strength can be improved by a heat treatment such as quenching is used. Although the type of spring steel is not particularly limited, SAE1022, which is the steel defined by the American Society of Automotive Engineers, for example, may be used. The chemical components of SAE1022 are Fe as the main component, 0.17-0.23 wt % of C, 0.70-1.00 wt % of Mn, and a small amount of Si, P, S, etc., as the remainder. As another example of the spring steel, a high-strength steel may be adopted. As an example, the chemical components (mass %) of a high-strength spring are C:0.40; Si:1.8; Mn:0.3; Cr:1.05; P:0.01; S:0.005; Ni:0.4; Cu:0.25; V:0.18; Ti:0.07; and Fe:the remainder.

The hollow rod 20 is bisymmetrical with respect to a symmetric axis X1 (FIG. 2). More specifically, the hollow rod 20 includes a torsion portion 25, curved portions 26 and 27, and arm portions 28 and 29. The torsion portion 25 extends in a width direction of the vehicle body 12. A direction indicated by arrow W1 in FIG. 1 is the width direction of the vehicle body 12. The arm portions 28 and 29 are continuous with both ends of the torsion portion 25 through the curved portions 26 and 27, respectively. Coating for rust prevention is applied to an outer surface of the hollow rod 20.

The shape of the stabilizer 10 is not limited to planar. The stabilizer 10 may include one or more bending portions in the torsion portion 25, or one or more bending portions in the arm portions 28 and 29, including a three-dimensional bent configuration, for example. The curved portions 26 and 27 may have a three-dimensional bent configuration. As described above, the stabilizer is formed in various shapes according to the specifications of the suspension mechanism.

On one end portion of the hollow rod 20, a first terminal sealed portion 30 is formed. On the other end portion of the hollow rod 20, a second terminal sealed portion 31 is formed. These terminal sealed portions 30 and 31 are formed by flattening the two end portions of the hollow rod 20 in a radial direction. For example, as both ends of the hollow rod 20 are flattened by plastic working such as forging, the terminal sealed portions 30 and 31 are formed. Inside the hollow rod 20, that is, between the first terminal sealed portion 30 and the second terminal sealed portion 31, an enclosed space 32 is formed.

In the present specification, of the entire hollow rod 20, a part which remains intact without being flattened, existing between the terminal sealed portions 30 and 31, is referred to as a rod main body 20a. Tapered portions 35 and 36 are formed between the rod main body 20a and the terminal sealed portion 30, and between the rod main body 20a and the terminal sealed portion 31, respectively. The tapered portions 35 and 36 are shaped such that their thicknesses are reduced from the rod main body 20a to the terminal sealed portions 30 and 31, respectively.

Eye portions 40 and 41 are formed in the terminal sealed portions 30 and 31, respectively. The eye portions 40 and 41 are connected to suspension arms, etc., of the suspension mechanism through rod-shaped connecting members 42 and 43 such as stabilizer links, respectively. The torsion portion 25 is supported by a part of the vehicle body 12, for example, via a pair of support portions 45 and 46 (FIG. 1). The support portions 45 and 46 each include a rubber bushing. Forces having opposite phases are input to the arm portions 28 and 29, when the vehicle 11 drives on a curve, for example. By this input of force, a bending force is exerted on the arm portions 28 and 29, and bending and torsional force is exerted on the curved portions 26 and 27. Further, as a repulsive load is produced by the torsion portion 25 being twisted, a rolling behavior of the vehicle body 12 is suppressed.

Figure 3:
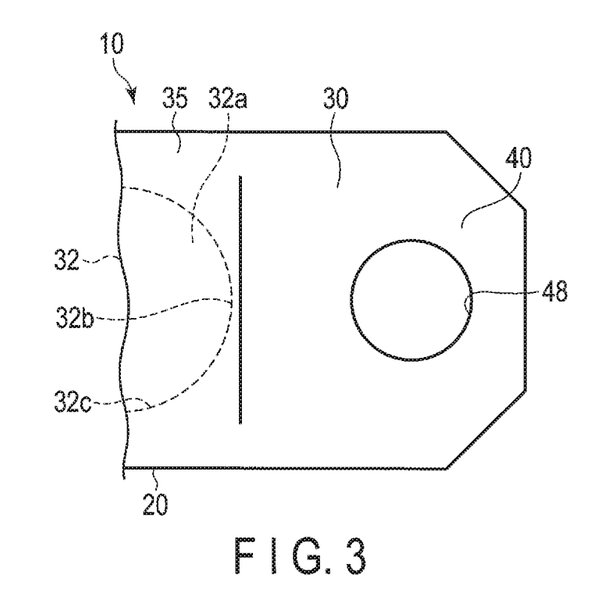
FIG. 3 is a plan view of one of eye portions of the hollow stabilizer shown in FIG. 2.

FIG. 3 shows the first terminal sealed portion 30 and the eye portion 40. The second terminal sealed portion 31 and the eye portion 41 (FIG. 2) are shaped similarly. In the following, the first terminal sealed portion 30 and the eye portion 40 will be described as a typical example of the terminal sealed portion and the eye portion. A circular through-hole 48 is formed in the eye portion 40. The connecting member 42 such as a stabilizer link is inserted into the through-hole 48.

Figure 4:
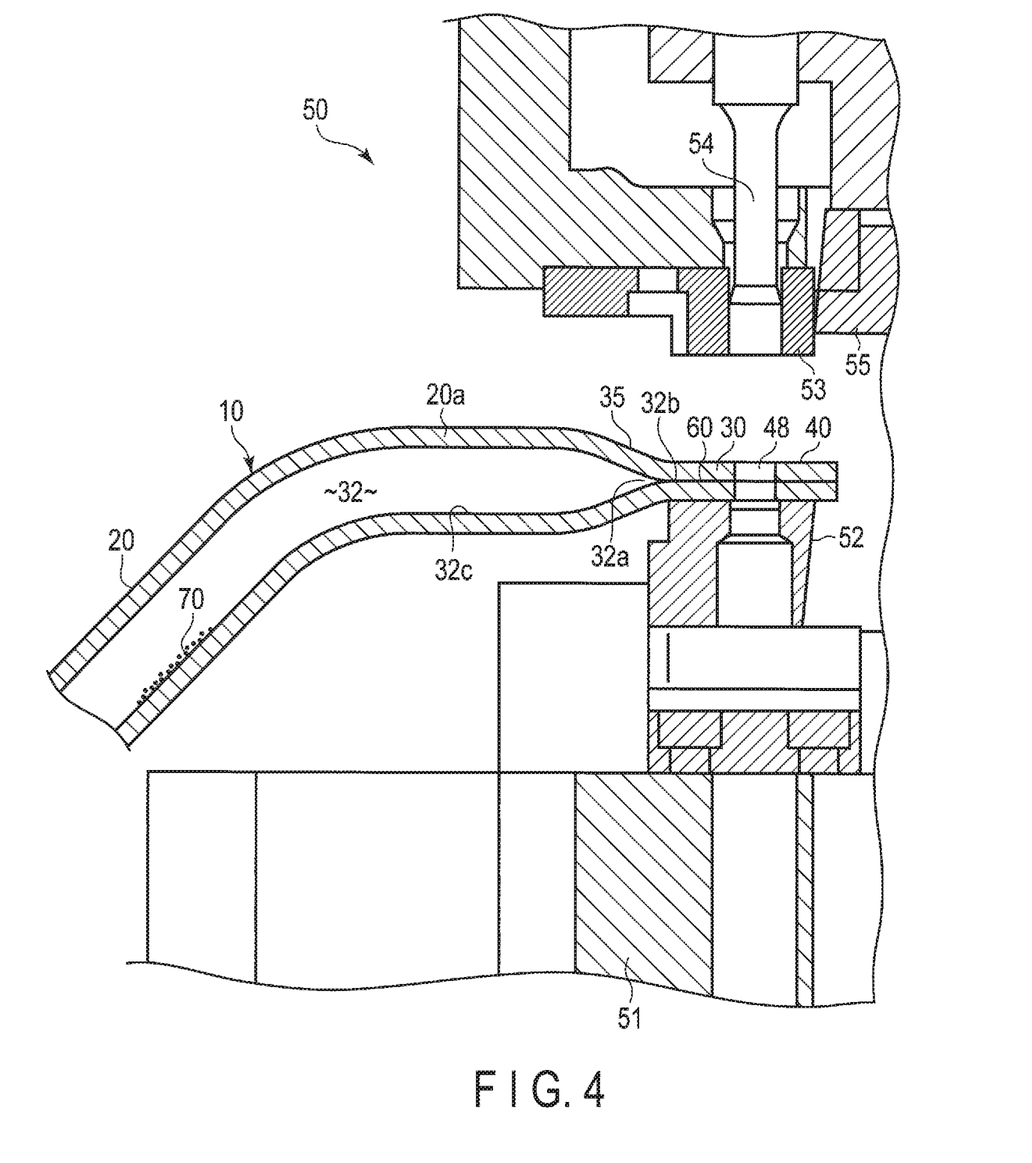
FIG. 4 is a cross-sectional view of a part of an apparatus which processes the eye portion of the hollow stabilizer shown in FIG. 2.

FIG. 4 shows a part of an apparatus 50 which processes the eye portion 40. The apparatus 50 which processes the eye portion 40 includes a lower die 52, an upper die 53, and a punch 54. The lower die 52 is arranged on a base 51. The upper die 53 is disposed above the lower die 52. The punch 54 is movable vertically. The terminal sealed portion 30 is pressed between the lower die 52 and the upper die 53. As the punch 54 is lowered in this pressurized state, the through-hole 48 is formed. As a peripheral edge of the eye portion 40 is cut by the lower blade 52 and an upper blade 55, trimming is performed.

By flattening the end portion of the hollow rod 20 in the radial direction as described above, the terminal sealed portion 30 is formed. Inside the terminal sealed portion 30, at substantially the center of the terminal sealed portion 30 in a thickness direction, an inner surface joined portion 60 is formed. The inner surface joined portion 60 is formed by press-bonding inner surfaces of the end portion of the flattened hollow rod 20 onto each other. The tapered portion 35 is formed between the rod main body 20a which remains intact and the terminal sealed portion 30. The thickness of the tapered portion 35 is reduced from the rod main body 20a to the terminal sealed portion 30. Inside the tapered portion 35, at an end of the enclosed space 32, a terminal gap 32a of a tapered shape is formed. In the terminal gap 32a, a gap is reduced toward the inner surface joined portion 60. A farthest end 32b of the terminal gap 32a reaches the inner surface joined portion 60 of the terminal sealed portion 30. Also in the terminal sealed portion 31 on the other side, a similar terminal gap 33a (FIG. 2) is formed.

Figure 5:
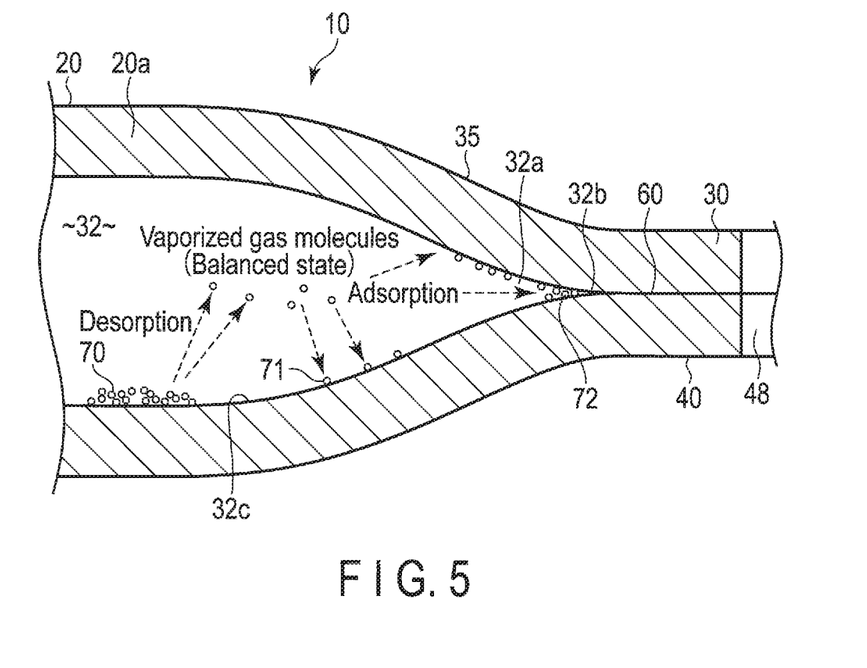
FIG. 5 is a cross-sectional view which schematically shows a part of the hollow stabilizer shown in FIG. 2 and a volatile powdered rust inhibitor.

FIG. 5 is a cross-sectional view schematically showing the terminal sealed portion 30, the tapered portion 35, and the eye portion 40. In the enclosed space 32 of the hollow rod 20, a volatile powdered rust inhibitor 70 is supplied. The volatile powdered rust inhibitor 70 is, for example, a benzoate such as ammonium benzoate, sodium benzoate, or organic amine benzoate. As an inorganic ingredient, a few percent of oxidized silicon may be included in the volatile powdered rust inhibitor 70 as necessary. The volatile powdered rust inhibitor 70 of the present embodiment is comprised of a number of particles. The particles have irregular shapes and irregular sizes. The size of each particle is approximately 10 to 150 μm. As another example, a volatile powdered rust inhibitor containing a nitrite such as sodium nitrite as the main ingredient may be used.

The volatile powdered rust inhibitor 70 of the present embodiment is supplied in an amount sufficient to bring the vaporized component (gas molecules) into a balanced state within the enclosed space 32. For example, in the case of a hollow stabilizer having a length of 150 cm, an inner diameter ϕ of 15 mm, and an internal volume of 265 cc, about 0.2 grams of volatile powdered rust inhibitor 70 is supplied. According to the component of the volatile powdered rust inhibitor 70 or the type of steel of the hollow rod 20, 0.3 to 1.0 gram of the volatile powdered rust inhibitor 70 may be supplied per the internal volume of 1000 cc.

The volatile powdered rust inhibitor 70 is supplied in an amount of bringing adsorption to and desorption from an inner surface 32c of the enclosed space 32 into balance at a temperature (for example, 0° C. or more) of the vehicle surrounding. The supplied volatile powdered rust inhibitor 70 sublimes and vaporizes within the enclosed space 32 of the hollow rod 20. The gas molecules of the volatile powdered rust inhibitor 70 which have reached a saturation state after vaporization make a rust-inhibiting atmosphere within the enclosed space 32. The gas molecules are reversibly adsorbed to the inner surface 32c of the enclosed space 32, that is, the surface of the steel material, physically or chemically. By this adsorption, an extremely thin inner surface rust-inhibiting film 71 of 10A or so, for example, is formed on the inner surface 32c of the enclosed space 32. By the inner surface rust-inhibiting film 71, it is possible to prevent rust from being formed on the inner surface 32c of the enclosed space 32. The gas molecules of the volatile powdered rust inhibitor 70 enter inside to a point of the farthest end 32b of the terminal gap 32a, and form a terminal rust-inhibiting film 72. Accordingly, formation of rust on the inner surface joined portion 60 of the terminal sealed portion 30 can also be suppressed.

Stress is applied repeatedly to the stabilizer 10 while the vehicle is moving. If some other factors come into play in addition to the above stress, a small pit or a small crack may be formed on the inner surface of the hollow rod 20 (the inner surface 32c of the enclosed space 32). When small pits or small cracks start to form on the inner surface of the hollow rod 20, a vaporized component of the volatile powdered rust inhibitor floating within the enclosed space 32 enters inside the small pit or small crack. Consequently, the inner surface rust-inhibiting film 71 and the terminal rust-inhibiting film 72 are formed. According to the stabilizer 10 of the present embodiment, by the inner surface rust-inhibiting film 71 and the terminal rust-inhibiting film 72 formed on the inner surface of the hollow rod 20, growth of the small pit and the small crack can be suppressed.

Figure 6:
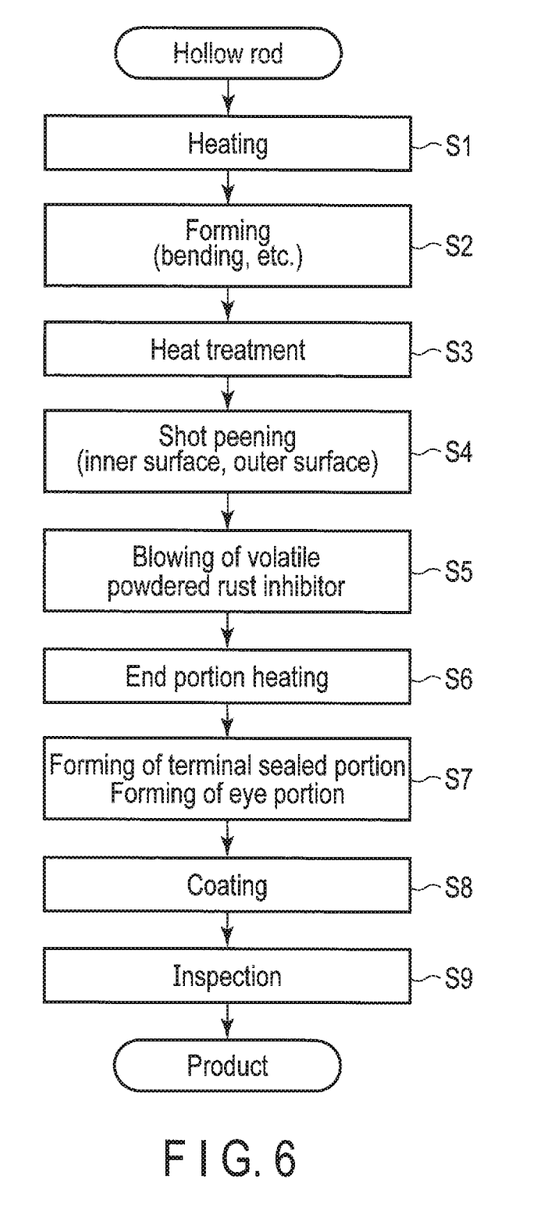
FIG. 6 is a flowchart showing an example of steps of manufacturing the hollow stabilizer shown in FIG. 2.

FIG. 6 is a flowchart showing an example of steps of manufacturing the stabilizer 10 of the present embodiment. For example, when the stabilizer 10 is formed by hot working (for example, in a temperature range in which steel is austenitized), the hollow rod 20 is heated in heating step S1 in FIG. 6. The heated hollow rod 20 is formed in a predetermined stabilizer shape by a bending machine in forming step S2. In heat treatment step S3, heat treatment such as quenching and tempering, or annealing for stress relief is performed as necessary. When the stabilizer 10 is to be formed by cold working (for example, at room temperature), heating step S1 can be omitted.

Figure 7:
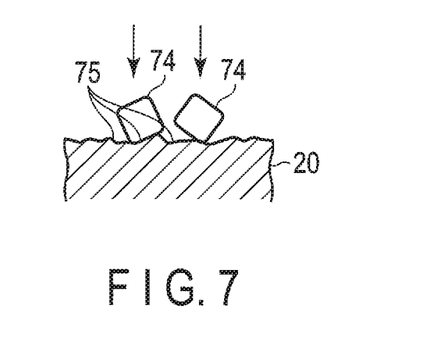
FIG. 7 is a cross-sectional view which schematically shows a part of the hollow stabilizer having shot peening indentations and shots.

In shot peening step S4 in FIG. 6, shot peening is carried out on the inner surface and the outer surface of the hollow rod 20. By the shot peening, compressive residual stress is formed on each of the inner surface and the outer surface of the hollow rod 20. When the shot peening is performed on the inner surface of the hollow rod 20, a reflective member is inserted in the hollow rod 20. Shots are projected at the reflective member. In this way, shot peening indentations, that is, a rough surface 75, is formed on the inner surface of the hollow rod 20 as schematically shown in FIG. 7. The rough surface 75 is constituted of multiple irregularities. An average surface roughness of the rough surface 75 is, for example, 5 to 6 μm.

Figure 8:
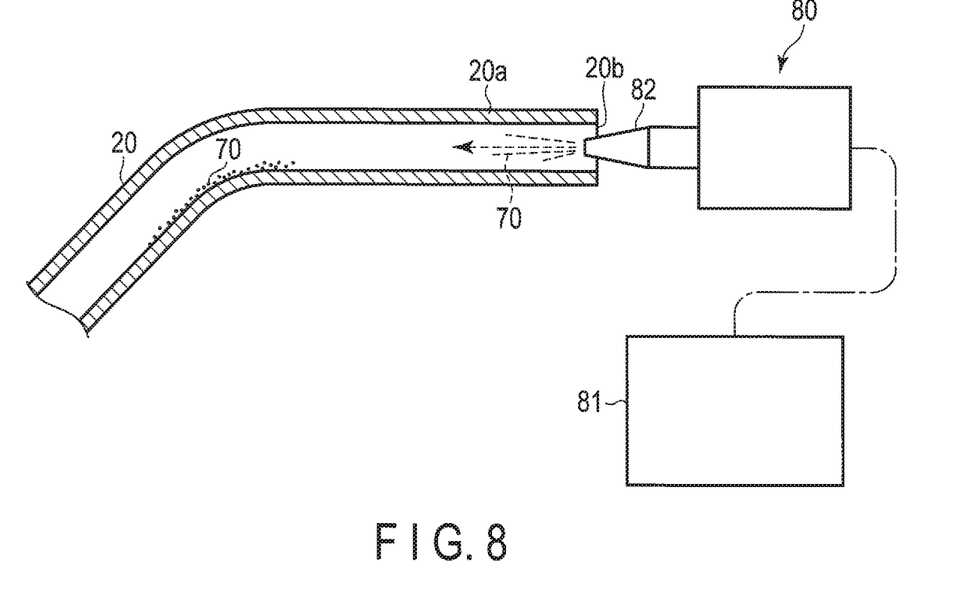
FIG. 8 is an illustration which schematically shows an example of a powdered rust inhibitor supplying apparatus.

In rust inhibitor supplying step S5 in FIG. 6, by a powdered rust inhibitor supplying apparatus 80 as shown in FIG. 8, the volatile powdered rust inhibitor 70 is supplied within the hollow rod 20. In rust inhibitor supplying step S5, the terminal sealed portion has not yet been formed in the hollow rod 20. Accordingly, both ends of the hollow rod 20 are open. The powdered rust inhibitor supplying apparatus 80 includes a powdered rust inhibitor supply source 81 and a nozzle 82. The volatile powdered rust inhibitor 70 is pneumatically transferred from the powdered rust inhibitor supply source 81 toward the nozzle 82 by gas such as air. The volatile powdered rust inhibitor 70 jetted out from the nozzle 82 is blown into the hollow rod 20 from an opening 20b on one side of the hollow rod 20.

For example, in the case of a hollow stabilizer having the internal volume of 265 cc, about 0.2 grams of volatile powdered rust inhibitor 70 is supplied. If the internal volume is greater than or smaller than the above, the volatile powdered rust inhibitor 70 in an amount according to the internal volume is supplied. The volatile powdered rust inhibitor 70 supplied within the hollow rod 20 does not vaporize immediately, but vaporizes by taking some time. Accordingly, the volatile powdered rust inhibitor 70 can stay inside the hollow rod 20.

In rust inhibitor supplying step S5, a part of the volatile powdered rust inhibitor 70 which has been blown into the hollow rod 20 may adhere to the end portion of the hollow rod 20. End portion heating step S6 is carried out after rust inhibitor supplying step S5. Since the end portion of the hollow rod 20 is heated in end portion heating step S6, the volatile powdered rust inhibitor 70 adhering to the end portion of the hollow rod 20 can be removed.

In end portion heating step S6, one of the end portions of the hollow rod 20 is heated to a temperature suitable for forging. Plastic working such as forging is performed for one of the heated end portions by end portion forming step S7. The first terminal sealed portion 30 is formed in end portion forming step S7, and the eye portion 40 is also formed. The other end portion of the hollow rod 20 is also heated by end portion heating step S6. Plastic working such as forging is performed for the other heated end portion by end portion forming step S7. The second terminal sealed portion 31 is formed in end portion forming step S7, and the eye portion 41 is also formed.

In this way, the terminal sealed portions 30 and 31 are formed on both ends of the hollow rod 20. Consequently, the enclosed space 32 is formed inside the hollow rod 20, in other words, between the terminal sealed portions 30 and 31. The volatile powdered rust inhibitor 70 trapped in the enclosed space 32 is gradually vaporized within the enclosed space 32. As the vaporized component (gas molecules) is adsorbed to the inner surface of the enclosed space 32, the inner surface rust-inhibiting film 71 is formed. Since the vaporized component also enters inside the terminal gap 32a, the terminal rust-inhibiting film 72 is formed.

In coating step S8, a rust-inhibiting coating is applied to the outer surface of the hollow rod 20 by electrostatic coating, etc. As the applied rust-inhibiting coating is fixed on the outer surface of the hollow rod 20 by a baking step, a coating film is formed. Lastly, quality inspection S9 is carried out and a product (hollow stabilizer) is completed.

In the case of a hollow stabilizer which is used under high stress for weight reduction, it is common to perform shot peening on the outer surface of the hollow rod 20 and the inner surface 32c of the enclosed space 32. In that case, a rough surface (i.e., the shot peening indentations shown in FIG. 7) 75 constituted of small irregularities on the inner surface 32c of the enclosed space 32 is formed. As the vaporized component of the volatile powdered rust inhibitor 70 contacts the inner surface 32c, the component of the volatile powdered rust inhibitor 70 is adsorbed to the rough surface 75. More specifically, the small irregularities of the rough surface 75 are covered with the components of the volatile powdered rust inhibitor 70. Accordingly, the inner surface rust-inhibiting film 71 can also be formed on the inner surface 32c including the rough surface 75 such as the shot peening indentations without problems. Moreover, since the vaporized component of the volatile powdered rust inhibitor 70 enters inside to the point of the farthest end 32b of the terminal gap 32a, the terminal rust-inhibiting film 72 is formed. Accordingly, formation of rust on the inner surface joined portion 60 can also be prevented.

Figure 9:
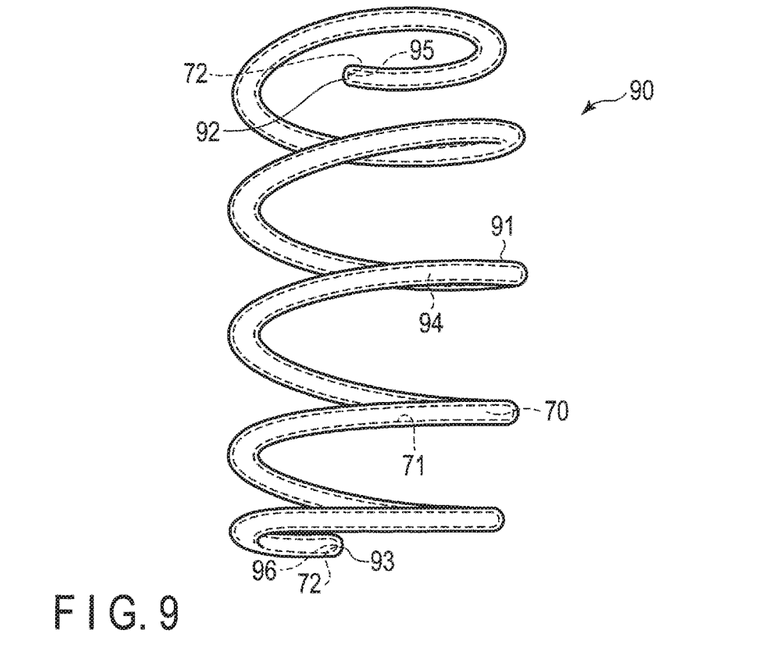
FIG. 9 is a perspective view showing an example of a hollow coil spring.

FIG. 9 shows a hollow coil spring 90 of a second embodiment. The hollow coil spring 90 includes a hollow rod (a hollow wire) 91 made of steel that is formed helically. Both ends of the hollow rod 91 are plastically worked in a temperature range of hot working. By the plastic working, a first terminal sealed portion 92 and a second terminal sealed portion 93 are formed. Accordingly, inside the hollow rod 91, that is, between the first terminal sealed portion 92 and the second terminal sealed portion 93, an enclosed space 94 is formed. A terminal gap 95 is formed on an inner side of the first terminal sealed portion 92 (i.e., one end of the enclosed space 94). A terminal gap 96 is formed on an inner side of the second terminal sealed portion 93 (i.e., the other end of the enclosed space 94).

Similarly to the hollow stabilizer 10 of the first embodiment, a volatile powdered rust inhibitor 70 is supplied in the enclosed space 94 inside the hollow coil spring 90. By a vaporized component of the volatile powdered rust inhibitor 70, an inner surface rust-inhibiting film 71 is formed on the inner surface of the enclosed space 94. By the inner surface rust-inhibiting film 71, rusting on an inner surface of the hollow rod 91 is suppressed. Also, the volatile powdered rust inhibitor 70 enters inside the terminal gaps 95 and 96 at the inner side of the terminal sealed portions 92 and 93. A terminal rust-inhibiting film 72 is formed by the vaporized component of the volatile powdered rust inhibitor 70 which has entered inside the terminal gaps 95 and 96. By the terminal rust-inhibiting film 72, rusting of the terminal gaps 95 and 96 is prevented.

Figure 10:
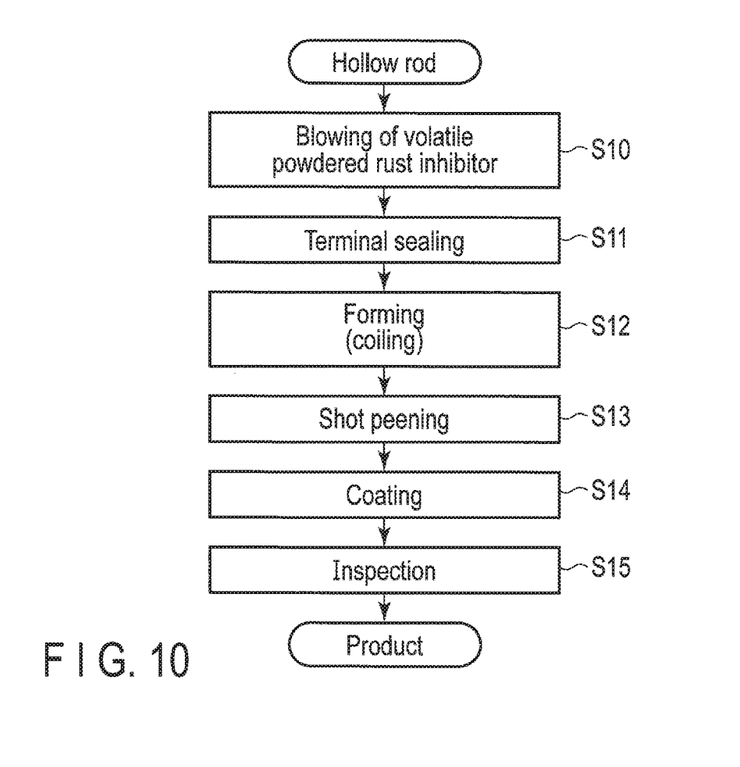
FIG. 10 is a flowchart showing an example of steps of manufacturing the hollow coil spring shown in FIG. 9.

FIG. 10 shows an example of steps of manufacturing the hollow coil spring 90. In rust inhibitor blowing step S10, a volatile powdered rust inhibitor is supplied within the hollow rod 91. In terminal sealing step S11, both ends of the hollow rod 91 are heated and plastically worked. By the plastic working, the terminal sealed portions 92 and 93 are formed. In forming step S12, the hollow rod 91 is formed into a helical shape by a coiling machine, etc. In a shot peening step S13, shot peening is performed on an outer surface of the hollow rod 91. In a coating step S14, coating is applied to the outer surface of the hollow rod 91. In inspection step S15, inspection is carried out, and a product (the hollow coil spring 90) is completed. In the steps of manufacturing a coil spring, a heat treatment step for stress relief, a setting step, a step for surface treatment, etc., may be included as necessary.

Needless to say, in carrying out the present invention, the specific forms of the inner surface joined portion of the terminal sealed portion, the terminal gap, and the like, may be modified variously. Further, other than the hollow stabilizer and the hollow coil spring explained in the above embodiments, a torsion bar, a ring spring, a swirl spring, etc., may be adopted as the hollow spring member, and the elements are not limited to those of the above embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a hollow spring member comprising:

performing shot-peening on an inner surface of a hollow rod which is made of steel and whose ends are open, thereby forming shot peening indentations on the inner surface of the hollow rod;

blowing a volatile powdered rust inhibitor, which comprises a number of particles, into one opening of the hollow rod, thereby applying the volatile powdered rust inhibitor onto the shot peening indentations on the inner surface of the hollow rod, the volatile powdered rust inhibitor being supplied in an amount sufficient to bring a vaporized component into a balanced state within the hollow rod, the volatile powdered rust inhibitor having reversibility which brings adsorption to and desorption from the inner surface of the hollow rod into balance in accordance with a temperature of the hollow rod;

removing the volatile powdered rust inhibitor adhered to one end portion of the hollow rod by heating the one end portion of the hollow rod;

forming a first terminal sealed portion which comprises a first inner surface joined portion, by flattening the heated one end portion along a radial direction of the hollow rod, the first terminal sealed portion including a first terminal gap that decreases in size toward the first inner surface joined portion;

removing the volatile powdered rust inhibitor adhered to the other end portion of the hollow rod by heating the other end portion of the hollow rod;

forming a second terminal sealed portion which comprises a second inner surface joined portion, by flattening the heated other end portion along the radial direction of the hollow rod, the second terminal sealed portion including a second terminal gap that decreases in size toward the second inner surface joined portion, thereby forming an enclosed space inside the hollow rod, an amount of the volatile powdered rust inhibitor which is contained in the enclosed space being an amount which brings adsorption to and desorption from an inner surface of the enclosed space into balance;

bending the hollow rod;

vaporizing a component of the volatile powdered rust inhibitor within the enclosed space, and creating a rust-inhibiting atmosphere within the enclosed space by the vaporized component of the volatile powdered rust inhibitor reaching a saturation state; and forming an inner surface rust-inhibiting film on the inner surface of the enclosed space by reversible adsorption of the vaporized and balanced component of the volatile powdered rust inhibitor to the inner surface of the enclosed space, forming a first terminal rust-inhibiting film on an inner surface of the first terminal gap by reversible adsorption of the vaporized component of the volatile powdered rust inhibitor to the inner surface of the first terminal gap and forming a second terminal rust-inhibiting film on an inner surface of the second terminal gap by reversible adsorption of the vaporized component of the volatile powdered rust inhibitor to the inner surface of the second terminal gap.

2. The method according to claim 1, wherein the volatile powdered rust inhibitor comprises ammonium benzoate, sodium benzoate, or organic amine benzoate.

3. The method according to claim 1, wherein the volatile powdered rust inhibitor comprises sodium nitrite.

4. The method according to claim 1, wherein, in the blowing of the volatile powdered rust inhibitor into the one opening of the hollow rod, the volatile powdered rust inhibitor is supplied in an amount of 0.3 to 1.0 gram of the volatile powdered rust inhibitor per 1000 cc of inner volume of the hollow rod.

5. The method according to claim 1, further comprising forming eye holes in the first terminal sealed portion and the second terminal sealed portion, respectively.

6. The method according to claim 1, further comprising applying a rust-inhibiting coating to an outer surface of the hollow rod.

7. The method according to claim 1, further comprising shot-peening an outer surface of the hollow rod.

8. The method according to claim 1, wherein the particles of the volatile powdered rust inhibitor have irregular shapes and sizes.

9. The method according to claim 1, wherein the particles of the volatile powdered rust inhibitor have sizes in a range of from 10 to 150 µm.

* * * * *